(12) United States Patent
Naka

(10) Patent No.: US 8,819,246 B2
(45) Date of Patent: Aug. 26, 2014

(54) COMMUNICATION APPARATUS, SYSTEM, METHOD AND RECORDING MEDIUM OF PROGRAM

(75) Inventor: Yosuke Naka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 216 days.

(21) Appl. No.: 13/349,992

(22) Filed: Jan. 13, 2012

(65) Prior Publication Data

US 2012/0210009 A1    Aug. 16, 2012

(30) Foreign Application Priority Data

Feb. 11, 2011    (JP) .................................. 2011-027986

(51) Int. Cl.
*G06F 15/16*    (2006.01)

(52) U.S. Cl.
USPC .......................................... 709/227; 709/228

(58) Field of Classification Search
USPC ................................................ 709/227, 228
See application file for complete search history.

(56) References Cited

U.S. PATENT DOCUMENTS

| 8,429,280 B2 * | 4/2013 | Venkateswaran ............. 709/227 |
| 2002/0161833 A1 * | 10/2002 | Niven et al. ................... 709/203 |
| 2012/0278474 A1 * | 11/2012 | Venkateswaran ............. 709/224 |

FOREIGN PATENT DOCUMENTS

JP    2005-184727    7/2005

* cited by examiner

*Primary Examiner* — Kenneth Coulter
(74) *Attorney, Agent, or Firm* — Staas & Halsey LLP

(57) ABSTRACT

A communication apparatus includes a memory that stores data and a processor to execute a procedure, the procedure including, obtaining time information which indicates a communication time period in which each of a first apparatus, a second apparatus and the communication apparatus is capable of communicating, deciding on the basis of the communication time period whether or not a first communication between the communication apparatus and the first apparatus is capable of being established in a first period of time, and whether or not a second communication between the first apparatus and the second apparatus is capable of being established in a second period of time which is later than the first period of time, and notifying the first apparatus of the first period of time, in which the data stored in the memory is transmitted to the second apparatus, after confirming the second period of time.

10 Claims, 14 Drawing Sheets

FIG. 4

| NO. | CONTENT | VALUE |
|---|---|---|
| 1 | SELF-NODE ADDRESS | 12.345.67.94 |
| 2 | UPPER NODE ADDRESS | 12.345.67.92 |
| 3 | TRANSMISSION DEADLINE | 2010/04/20 23:59 |
| 4 | EXPECTED ARRIVAL DATE AND TIME | 2010/04/20 12:50 |
| 5 | LAYER DATA | 3 |
| 6 | NUMBER OF NODES THAT CAN BE RELAYED | 30 |
| 7 | AVERAGE SIZE | 51.4 |
| 8 | COMMUNICATION-ENABLED PERIODS OF TIME DATA | 010200230301... |

FIG. 5

| DATA SOURCE | LAYER | NODE NAME | UPPER NODE NAME | TRANSMISSION DEADLINE | EXPECTED ARRIVAL DATE AND TIME | COMMUNICATION-ENABLED PERIODS OF TIME | NUMBER OF NODES | SIZE |
|---|---|---|---|---|---|---|---|---|
| UPPER NODE | 0 | 12.345.67.89 | — | — | — | ...1112222222222... | 1000 | 51.4 |
| UPPER NODE | 1 | 12.345.67.90 | 12.345.67.89 | 2010/4/20 23:59 | 2010/4/20 12:50 | ...000100111223... | 300 | 51.4 |
| UPPER NODE | 1 | 12.345.67.88 | 12.345.67.89 | 2010/4/20 23:59 | 2010/4/20 12:50 | ...000100111223... | 300 | 51.4 |
| UPPER NODE | 2 | 12.345.67.92 | 12.345.67.90 | 2010/4/20 23:59 | 2010/4/20 12:50 | ...000102202300... | 110 | 51.4 |
| UPPER NODE | 2 | 12.345.67.91 | 12.345.67.90 | 2010/4/20 23:59 | 2010/4/20 12:50 | ...000100100030... | 100 | 51.4 |
| EQUAL NODE | 3 | 12.345.67.93 | 12.345.67.92 | 2010/4/20 23:59 | 2010/4/20 12:50 | ...001110003000... | 40 | 51.4 |
| EQUAL NODE | 3 | 12.345.67.95 | 12.345.67.92 | 2010/4/20 23:59 | 2010/4/20 12:50 | ...111200300000... | 40 | 51.4 |
| SELF-NODE | 3 | 12.345.67.94 | 12.345.67.92 | 2010/4/20 23:59 | 2010/4/20 12:50 | ...022123100000... | 30 | 51.4 |
| LOWER NODE | 4 | 12.345.67.96 | 12.345.67.94 | 2010/4/20 23:59 | 2010/4/20 12:50 | ...000230000000... | 6 | 51.4 |
| LOWER NODE | 4 | 12.345.67.97 | 12.345.67.94 | 2010/4/20 23:59 | 2010/4/20 12:50 | ...203000000000... | 10 | 51.4 |
| LOWER NODE | 4 | 12.345.67.98 | 12.345.67.94 | 2010/4/20 23:59 | 2010/4/20 12:50 | ...030000000000... | 1 | 51.4 |

FIG. 6

| PERIOD OF TIME (UNIT: 10 MIN) | CPU USAGE RATE FOR LATEST 5 DAYS | | | | | ADD-UP | |
|---|---|---|---|---|---|---|---|
| | WED | THU | FRI | MON | TUE | AVERAGE | COMMUNICATION |
| ⋮ | ⋮ | ⋮ | ⋮ | ⋮ | ⋮ | ⋮ | ⋮ |
| 9:00~9:10 | 5% | 0% | 5% | 6% | 5% | 4% | ○ |
| 9:10~9:20 | 4% | 0% | 2% | 5% | 2% | 3% | ○ |
| 9:20~9:30 | 6% | 0% | 9% | 6% | 5% | 5% | ○ |
| 9:30~9:40 | 4% | 4% | 9% | 5% | 4% | 5% | ○ |
| 9:40~9:50 | 10% | 15% | 9% | 10% | 10% | 11% | × |
| 9:50~10:00 | 12% | 13% | 12% | 10% | 11% | 12% | × |
| ⋮ | ⋮ | ⋮ | ⋮ | ⋮ | ⋮ | ⋮ | ⋮ |

FIG. 7A

| HOUR | MINUTES | | | | | |
|---|---|---|---|---|---|---|
| | 00~10 | 10~20 | 20~30 | 30~40 | 40~50 | 50~60 |
| 00 | 0 | 0 | 0 | 0 | 0 | 0 |
| 01 | 0 | 0 | 0 | 0 | 0 | 0 |
| 02 | 0 | 0 | 0 | 0 | 0 | 0 |
| 03 | 0 | 0 | 0 | 0 | 0 | 0 |
| 04 | 0 | 0 | 0 | 0 | 0 | 0 |
| 05 | 0 | 0 | 0 | 0 | 0 | 0 |
| 06 | 0 | 0 | 0 | 0 | 0 | 0 |
| 07 | 0 | 0 | 0 | 0 | 0 | 0 |
| 08 | 0 | 0 | 0 | 1 | 1 | 0 |
| 09 | 1 | 1 | 1 | 1 | 0 | 0 |
| 10 | 0 | 0 | 0 | 0 | 1 | 1 |
| 11 | 0 | 0 | 0 | 0 | 0 | 0 |
| 12 | 1 | 1 | 1 | 1 | 1 | 1 |
| 13 | 1 | 0 | 0 | 0 | 0 | 0 |
| ⋮ | ⋮ | ⋮ | ⋮ | ⋮ | ⋮ | ⋮ |
| 22 | 0 | 0 | 0 | 0 | 0 | 0 |
| 23 | 0 | 0 | 0 | 0 | 0 | 0 |

FIG. 7B

⇒ EXAMPLE OF MAKING COMMUNICATION-ENABLED PERIODS OF TIME DATA:

COMMUNICATION-ENABLED PERIODS OF TIME (EXCERPTED)

| | 11:00~11:10 | 11:10~11:20 | 11:20~11:30 | 11:30~11:40 | 11:40~11:50 | 11:50~12:00 | 12:00~12:10 | 12:10~12:20 | 12:20~12:30 | 12:30~12:40 |
|---|---|---|---|---|---|---|---|---|---|---|
| UPPER NODE | 0 | 0 | 0 | 1 | 0 | 1 | 2 | 0 | 2 | 3 |
| SELF-NODE | 0 | 2 | 2 | 1 | 2 | 1 | 1 | 0 | 0 | 0 |
| RESERVATION-ENABLED | | | | ○ | | ◎ | | | | |

FIG. 8B

COMMUNICATION-ENABLED PERIODS OF TIME (EXCERPTED)

| | 11:00~11:10 | 11:10~11:20 | 11:20~11:30 | 11:30~11:40 | 11:40~11:50 | 11:50~12:00 | 12:00~12:10 | 12:10~12:20 | 12:20~12:30 | 12:30~12:40 |
|---|---|---|---|---|---|---|---|---|---|---|
| UPPER NODE | 0 | 0 | 0 | 1 | 0 | 2 | 2 | 0 | 2 | 3 |
| SELF-NODE | 0 | 2 | 2 | 1 | 2 | 3 | 1 | 0 | 0 | 0 |
| RESERVATION-ENABLED | | | | | | ◎ | | | | |

FIG. 9A

| | COMMUNICATION-ENABLED PERIODS OF TIME (EXCERPTED) | | | | | | | | | |
|---|---|---|---|---|---|---|---|---|---|---|
| | 11:00 ~ 11:10 | 11:10 ~ 11:20 | 11:20 ~ 11:30 | 11:30 ~ 11:40 | 11:40 ~ 11:50 | 11:50 ~ 12:00 | 12:00 ~ 12:10 | 12:10 ~ 12:20 | 12:20 ~ 12:30 | 12:30 ~ 12:40 |
| MANAGEMENT SERVER | 0 | 0 | 0 | 2 | 2 | 2 | 0 | 0 | 2 | 2 |
| SELF-NODE | 0 | 2 | 2 | 1 | 2 | 1 | 1 | 0 | 0 | 0 |
| RESERVATION-ENABLED | | | | | | | | | | |

FIG. 9B

| | COMMUNICATION-ENABLED PERIODS OF TIME (EXCERPTED) | | | | | | | | | |
|---|---|---|---|---|---|---|---|---|---|---|
| | 11:00 ~ 11:10 | 11:10 ~ 11:20 | 11:20 ~ 11:30 | 11:30 ~ 11:40 | 11:40 ~ 11:50 | 11:50 ~ 12:00 | 12:00 ~ 12:10 | 12:10 ~ 12:20 | 12:20 ~ 12:30 | 12:30 ~ 12:40 |
| MANAGEMENT SERVER | 0 | 0 | 0 | 2 | 2 | 2 | 2 | 0 | 2 | 2 |
| SELF-NODE | 0 | 2 | 2 | 1 | 2 | 1 | 3 | 0 | 0 | 0 |
| RESERVATION-ENABLED | | | | | | | ◎ | | | |

FIG. 14

| | COMMUNICATION-ENABLED PERIODS OF TIME (EXCERPTED) | | | | | | | | | DEADLINE |
|---|---|---|---|---|---|---|---|---|---|---|
| | 11:00~11:10 | 11:10~11:20 | 11:20~11:30 | 11:30~11:40 | 11:40~11:50 | 11:50~12:00 | 12:00~12:10 | 12:10~12:20 | 12:20~12:30 | 12:30~12:40 | |
| MANAGEMENT SERVER | 2 | 2 | 2 | 2 | 2 | 2 | 2 | 2 | 2 | 1 | 1 |
| UPPER 1 | 0 | 0 | 0 | 0 | 0 | 0 | 2 | 2 | 3 | 0 | 0 |
| UPPER 2 | 2 | 0 | 2 | 2 | 0 | 2 | 3 | 0 | 0 | 0 | 0 |
| UPPER 3 | 1 | 2 | 1 | 3 | 0 | 0 | 1 | 0 | 0 | 2 | 0 |
| SELF-NODE | 2 | 2 | 1 | 2 | 2 | 2 | × | × | × | × | 1 |
| REACH BEFORE DEADLINE | ○ | ○ | ◎ | × | × | × | × | × | × | × | × |

COMMUNICATION APPARATUS, SYSTEM, METHOD AND RECORDING MEDIUM OF PROGRAM

CROSS-REFERENCE TO RELATED APPLICATION

This application is based upon and claims the benefit of priority of the prior Japanese Patent Application No. 2011-027986, filed on Feb. 11, 2011, the entire contents of which are incorporated herein by reference.

FIELD

The embodiment relates to a communication apparatus, a communication system, a communication method and a program for transmitting data.

BACKGROUND

Various kinds of apparatus including a personal computer, a server and a mobile phone each have asset data including hardware-specific data, software data, user data and so forth, for example, CPU utilization, utilization of a storage, electric consumption and so on. A management system which collects asset data that the apparatus individually has is known.

The management system is provided with a management server for collecting asset data individually from the apparatus. If the management server manages lots of apparatuses, connections for transmitting the asset data individually from the apparatuses concentrate on the management server, resulting in a heavy load put on the management server. Thus, it takes long time to store the asset data in the management server and some of the asset data may fail to be stored in some cases.

An ordinary technology for providing a relay server and controlling the number of apparatuses to be coupled at the same time by layering a communication network so as to reduce the load put on the management server caused by such concentrated connection is known, e.g., as disclosed in Japanese Laid-open Patent Publication No. 2005-184727.

SUMMARY

According to an aspect of the invention, an apparatus includes a memory that stores data and a processor to execute a procedure, the procedure including, obtaining time information which indicates a communication time period in which each of a first apparatus, a second apparatus and the communication apparatus is capable of communicating, deciding on the basis of the communication time period whether or not a first communication between the communication apparatus and the first apparatus is capable of being established in a first period of time, and whether or not a second communication between the first apparatus and the second apparatus is capable of being established in a second period of time which is later than the first period of time, and notifying the first apparatus of the first period of time, in which the data stored in the memory is transmitted to the second apparatus, after confirming the second period of time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of node data;

FIG. 5 illustrates an example of making a connection end list;

FIG. 6 illustrates an exemplary added-up result;

FIGS. 7A and 7B illustrate conditions of communication-enabled periods of time;

FIGS. 8A and 8B illustrate diagrams for comparing exemplary periods of time data between the self-node and an upper node;

FIGS. 9A and 9B illustrate diagrams for comparing exemplary periods of time data between the self-node and a management server;

FIG. 14 illustrates a transmission path from the self-node to the management server.

DESCRIPTION OF EMBODIMENTS

The embodiment will be specifically explained on the basis of the drawings below.

Figure 1:
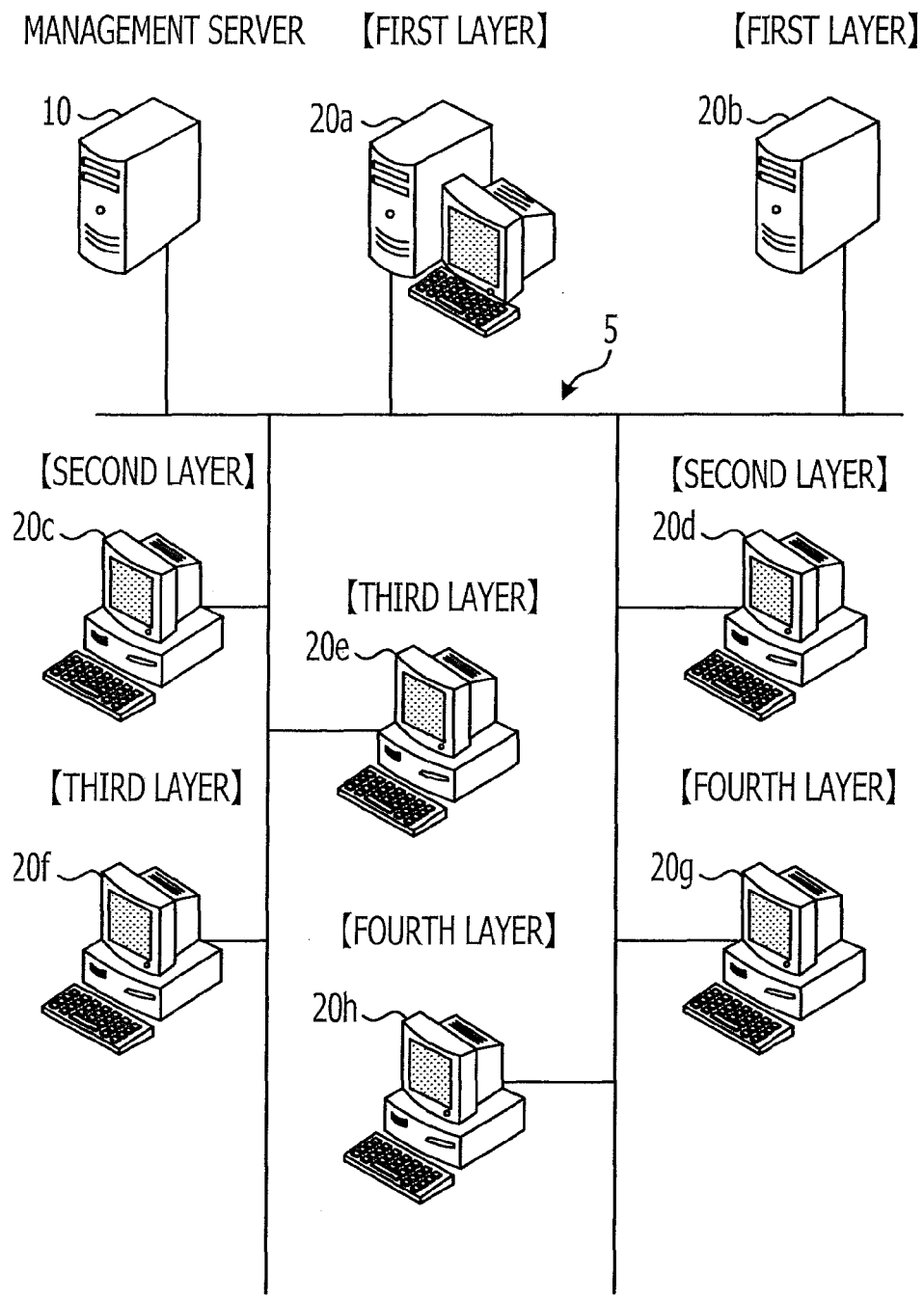
FIG. 1 illustrates an example of an entire constitution of a communication system of the embodiment.

FIG. 1 illustrates an example of an entire constitution of a communication system of the embodiment. The communication system of the embodiment includes a management server 10 and a plurality of communication apparatuses 20a, 20b and so forth being nodes to be managed by the management server 10 which are coupled to one another through a communication network 5 such as the Internet or a WAN in such a way as to be enabled to communicate with one another.

The management server 10 is a server which collects and manages asset data individually stored in the communication apparatuses 20a, 20b and so forth. The communication apparatuses 20a, 20b and so forth are various kinds of apparatuses equipped with communication functions such as a personal computer, a server, a mobile phone, a mobile data terminal, etc. Asset data such as data related to specific hardware, data related to software or user data is stored individually in the communication apparatuses 20a, 20b and so forth.

The communication network 5 is being layered. Let the management server 10 be a node of a 0-th layer, and connect the communication apparatuses 20a and 20b being nodes of a first layer to the management server 10. The communication apparatuses 20c, 20d, ..., 20h being nodes of other layers are similarly placed in such a way that a node of an n-th layer (n is an integer and is one or more) is coupled to a node of an (n−1)-th layer being its immediately upper node.

The communication apparatuses 20a, 20b and so forth of the respective nodes each manage data of a period of time in which communication is enabled as described later, and reserve transmission of asset data for a period of time with an upper node including the management server 10. If a reservation is made, the communication apparatuses of the respective nodes each transmit the asset data in the relevant period of time.

The communication apparatuses 20a, 20b and so forth of the respective nodes of the embodiment each autonomously reserve transmission with an upper node and transmits the asset data in a period of time specified by the reservation for transmission so as to attempt load distribution on the communication network 5.

Figure 2:
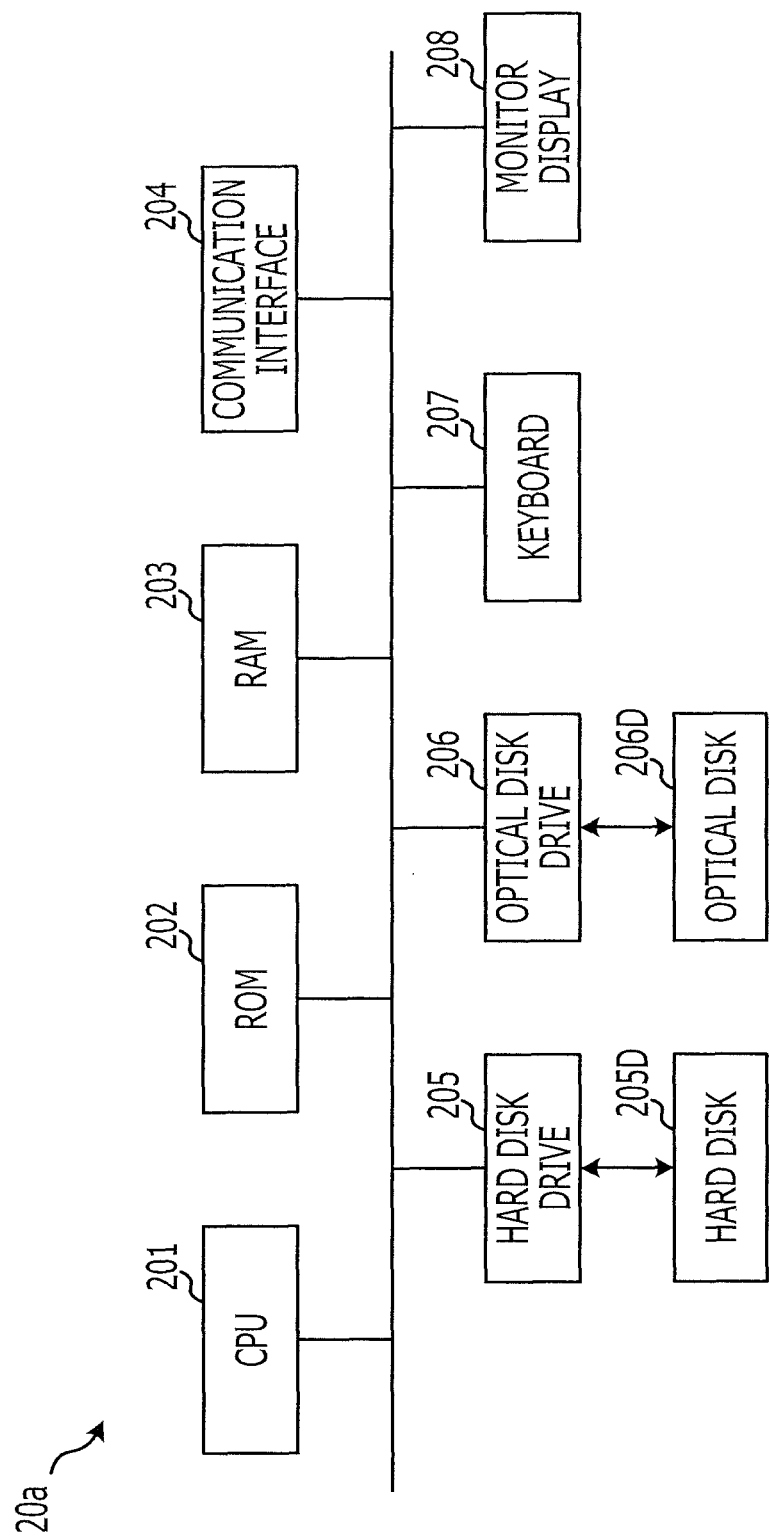
FIG. 2 illustrates an example of a hardware constitution of a communication apparatus.

FIG. 2 illustrates an example of a hardware constitution of the communication apparatus 20a. The communication apparatus 20a has a CPU 201, a ROM 202, a RAM 203, a communication interface 204, a hard disk drive 205, an optical disk drive 206, a keyboard 207 and a display monitor 208.

A computer program for controlling operations of the respective hardware portions is stored in the ROM 202. Further, a computer program for implementing the communication method of the application is stored in a hard disk 205D.

The CPU 201 reads and runs the computer program stored in the ROM 202 or the hard disk 205D at the right time so as to control operations of the respective hardware portions described above and to make the communication apparatus 20a work as the communication apparatus of the application. The CPU 201 is an example of a processor which executes a the computer program. The processor is a hardware to carry out operations based on at least one program (such as the computer program) and control other hardware, such as the CPU 201, a GPU (Graphics Processing Unit), FPU (Floating point number Processing Unit) and DSP (Digital signal Processor).

The RAM 203 is a type of memory, e.g., a DRAM (Dynamic RAM), an SRAM (Static RAM) or a flash memory, etc. Various data generated when the CPU 201 runs the computer program (e.g., operation results or various kinds of parameters) is temporarily stored in the RAM 203.

The communication interface 204 communicates with other communication apparatuses 20b, 20c and so forth or the management server 10 through the communication network 5.

The hard disk drive 205 controls operations for writing and reading data to and from the hard disk 205D, which is a type of memory. The hard disk drive 205 writes data accepted through the keyboard 207, received by the communication interface 204, read from an optical disk 206D by the optical disk drive 206 and so forth to the hard disk 205D, so as to store various data in the hard disk 205D.

The optical disk drive 206 controls operations for writing data to the optical disk 206D and reading data recorded on the optical disk 206D. Incidentally, although it is supposed as to the embodiment that the computer program for implementing the communication method of the application is stored in the hard disk 205D, the computer program may be stored in the optical disk 206D and provided.

The keyboard 207 accepts an operation and a character input, e.g., done by a user of the communication apparatus 20a. The display monitor 208 displays data that the user is notified of.

If the communication apparatus 20a may be remotely operated through the communication network 5, the optical disk drive 206, the keyboard 207, the display monitor 208 and so forth may be omitted.

The other communication apparatuses 20b, 20c and so forth and the management server 10 may each have a same hardware constitution as that of the communication apparatus 20a, and have, e.g., a CPU, a ROM, a RAM, a communication interface, a hard disk drive, etc.

Figure 3:
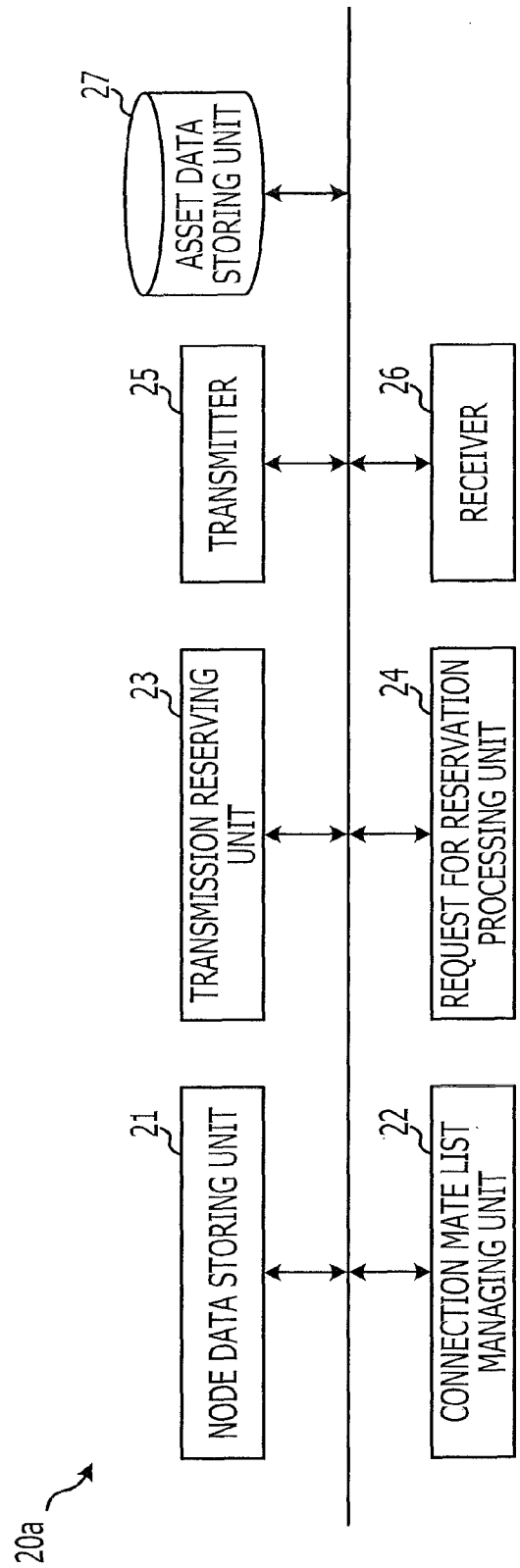
FIG. 3 illustrates an example of a functional constitution of the communication apparatus.

FIG. 3 illustrates a functional constitution of the communication apparatus 20a. The communication apparatus 20a has a node data storing unit 21, a connection end list managing unit 22, a transmission reserving unit 23, a request for reservation processing unit 24, a transmitter 25, a receiver 26 and an asset data storing unit 27.

For example, the CPU 201 runs the computer program stored in the ROM 202 or the hard disk 205D and controls the respective hardware portions illustrated in FIG. 2, so as to implement respective functions by means of the node data storing unit 21, the connection end list managing unit 22, the transmission reserving unit 23 and the request for reservation processing unit 24. For example, the communication interface 204 is implemented functions of the transmitter 25 and the receiver 26. For example, the RAM 203, the hard disk 205D or optical disk 206D implemented function of asset data storing unit 27.

Node data is stored in the node data storing unit 21 for carrying out communication with an upper node coupled to the communication network 5.

FIG. 4 illustrates an example of the node data. A row of a self-node address includes an address allotted to the self-node (self-apparatus) on the communication network 5. A row of an upper node address includes an address allotted to an apparatus of an upper node coupled to the self-node on the communication network 5.

A row of a transmission deadline includes a deadline for transmission of the asset data of the self-node to the management server 10, and is defined beforehand by an operation policy.

A row of an expected arrival date and time includes a date and time when the asset data transmitted from the self-node arrives at the management server 10. Obtain data related to the expected arrival date and time that an apparatus of an upper node keeps from the upper node. Incidentally, if no upper node to be coupled to is defined, a same date and time as the transmission deadline is set to the expected arrival date and time.

A row of layer data includes data indicating on which layer the self-node relays transmitted data. Identify the layer of the self-node from a layer of a node that the connection end list is obtained from. As the embodiment is constituted in such a way that the connection end list is obtained from an upper node, the layer of the self-node is n+1 if the layer of the node that the connection end list is obtained from is n.

A row of the number of nodes that may be relayed includes the number of nodes enabled to be relayed in a frame of a reservation. The node data storing unit 21 calculates the number of nodes that may be relayed by using a following method for calculation.

The number of nodes that may be relayed in a frame of a reservation, n, is calculated by division of a schedule unit of a communication-enabled period of time (a time length of a frame of a reservation: e.g., ten minutes) by a time length for transmission per one node (e.g., 5000 msec).

The time length of a frame of a reservation mentioned here is a preset time length. Further, let a time length required for transmission last time, a last time transmission size and an average size of the asset data per one node be T, Sa and Sb, respectively, and the time length for transmission per one node is then calculated by T×Sb/Sa. As data of the time length required for transmission last time, T, or the last time transmission size Sa cannot be obtained if there is no transmission record, the communication apparatus 20a may be configured to make a transmission record beforehand. Transmit a packet for survey use of a specific size to an upper node, e.g., and detect a response data rate so that a time length required for transmission may be calculated with respect to the size of the transmitted packet. Further, the average size of the asset data Sb is an average of the sizes of the asset data attached to the connection end list. If the average size of the asset data Sb cannot be obtained, a size of asset data of the self-node may be used instead.

A row of the average size of the asset data per one node includes a value calculated by the management server 10. As having collected the asset data that the communication apparatuses 20*a*, 20*b* and so forth each keep, the management server 10 may calculate the average size of the asset data per one node. The nodes which directly transmit the asset data to the management server 10 (e.g., the communication apparatuses 20*a* and 20*b*) each obtain the data of the average size calculated by the management server 10. Further, the other nodes (e.g., the communication apparatuses 20*c*, 20*d* and so forth) each obtain the data of the average size as included in the connection end list from the upper node.

A row of communication-enabled periods of time data includes a period of time in which communication is enabled by means of the self-node. Indicate periods of time in which communication is not enabled, communication is enabled, a reservation for receiving is accepted from a lower node and a reservation for transmission is made with an upper node as "0", "1", "2" and "3", respectively, e.g., and indicate condition in every period of time by using one of numerals "0" through "3". Let the period of time be ten minutes in length, and the communication-enabled periods of time for 24 hours may be indicated by a value of 144 digits.

Incidentally, suppose that a lower node reserves one node per one period of time (per one frame) as explained below. As the number of nodes that may be relayed is not limited to one, though, the lower node may reserve a plurality of nodes per one frame of a reservation depending upon management of conditions as to whether the respective nodes may each afford to receive asset data from more nodes.

The node data storing unit 21 updates the communication-enabled periods of time data included in the node data if the self-node reserves transmission with another node or consents to a reservation for transmission requested by another node.

The connection end list managing unit 22 makes a connection end list to be distributed to a lower node and obtains a connection end list distributed by an upper node.

A connection end list includes data related to communication-enabled periods of time of an upper node, the self-node and a lower node. Further, the connection end list includes a transmission deadline, an expected arrival date and time, the number of nodes that may be relayed and an average size of asset data transmitted by one node.

The connection end list managing unit 22 merges node data included in a connection end list obtained from an upper node, node data of the self-node and node data of a lower node having reserved connection with the self-node, so as to make a new connection end list. Remove a node placed higher than the lower node by three layers or more and not on a transmission and receiving path at this time. The connection end list having been made in this way includes node data on a transmission and receiving path from a node to which the list is distributed to the management server 10.

FIG. 5 illustrates an example of making a connection end list. FIG. 5 illustrates a list on which node data included in a connection end list obtained from an upper node, node data of the self-node and node data of a lower node having reserved connection with the self-node are merged.

Node data of an upper node illustrated in FIG. 5 is included in a connection end list obtained from an upper node that the self-node is coupled to (the node having an address of "12.345.67.92"). Add data of the self-node and a coupled lower node to the data of the upper node so as to make a connection end list to be distributed to a lower node.

Remove a node not put on a transmission and receiving path and placed higher than the lower node by three layers or more at this time. Nodes not put on the transmission and receiving path from the lower node to the management server 10 in FIG. 5 are four nodes having addresses "12.345.67.93" and "12.345.67.95" on the third layer, "12.345.67.91" on the second layer and "12.345.67.88" on the first layer. A node placed three layers or more apart from the lower node is the one having the address "12.345.67.88" on the first layer, thus remove this node and make a connection end list.

The transmission reserving unit 23 reserves transmission with an upper node so as to transmit the asset data of the self-node. The request for reservation processing unit 24 accepts a reservation for transmission requested by a lower node. Further, the request for reservation processing unit 24 decides whether to consent to or turn down the request having been accepted, and notifies the node having requested the reservation of the decision.

What is processed by the transmission reserving unit 23 and the request for reservation processing unit 24 will be described later in detail.

The transmitter 25 transmits the asset data stored in the asset data storing unit 27 to an upper node that transmission is reserved with in accordance with the communication-enabled periods of time data included in the node data in the node data storing unit 21. Further, the receiver 26 receives asset data transmitted from a lower node, etc. The asset data of the lower node received by the receiver 26 is stored in the asset data storing unit 27.

The functional constitution of the communication apparatus 20*a* has been explained with reference to FIG. 3. Functional constitutions of the other communication apparatuses 20*b*, 20*c* and so forth are same as that of the communication apparatus 20*a*.

Further, the management server 10 has functional portions including a node data storing unit, a connection end list managing unit, a request for reservation processing unit, a transmitter, a receiver and an asset data storing unit (not illustrated) similarly as the communication apparatus 20*a*. Incidentally, although receiving and processing a request for reservation for transmission from a lower node, the management server 10 does not reserve transmission with an upper node and thus may lack a functional constitution corresponding to the transmission reserving unit 23 of the communication apparatus 20*a*.

Further, the node data and the connection end list may lack data related to an upper node.

A method for reserving transmission of asset data with an upper node and a method for processing a reservation requested by a lower node will be explained below. In order to reserve transmission of asset data with an upper node, compare the communication-enabled periods of time data of the upper node included in the connection end list with the communication-enabled periods of time data of the self-node so as to reserve transmission.

The communication-enabled periods of time data of the self-node may be made, e.g., as follows. Let a schedule unit of a period of time in which communication is enabled be ten minutes in length. Sample load conditions (e.g., a CPU usage rate) at ten-minute intervals as required, and add up the samples for the latest five days. Let the CPU usage rate be zero percent in a period of time in which the self-node is powered off, suspended or put on standby, though. FIG. 6 illustrates an exemplary added-up result. Suppose that communication is enabled and not enabled if the CPU usage late for the latest five days is lower than ten percent and is not lower than ten percent, respectively. As average values of the CPU usage rate are lower than ten percent in periods of time 9:00-9:10, 9:10-9:20, 9:20-9:30 and 9:30-9:40 as illustrated in FIG. 6, e.g., set those periods of time communication-enabled. Meanwhile, as the CPU usage rates are not lower than ten percent in periods of time 9:40-9:50 and 9:50-10:00, set those periods of time communication-disabled.

FIGS. 7A and 7B illustrate conditions of communication-enabled periods of time. FIG. 7A illustrates a table on which communication-enabled periods of time are defined from average values of the CPU usage rates in the respective periods of time. A communication-disabled period of time and a communication-enabled period of time are indicated by "0" and "1", respectively. The node data storing unit 21 stores in itself data of the periods of time for 24 hours from 0:00 to 24:00 as a 144-digit value (see FIG. 7B).

Incidentally, the data of the periods of time stored in the node data storing unit 21 is updated as required. Upon consenting to a reservation requested by a lower node, update a digit of a relevant period of time to "2". Upon making a reservation with an upper node, update a digit of a relevant period of time to "3".

FIGS. 8A and 8B illustrate diagrams for comparing exemplary periods of time data between the self-node and an upper node. Periods of time from 11:00 to 12:40 are excerpted and illustrated in FIGS. 8A and 8B. Communication-enabled periods of time common to the self-node and the upper node are 11:30-11:40 and 11:50-12:00 as illustrated in FIG. 8A. Reserve a transmission for transmitting the asset data in the period of time 11:50-12:00 which is closer to a period of time in which the upper node expects transmission (12:30-12:40).

If transmission is reserved with the upper node, the self-node and the upper node each update the communication-enabled periods of time data. The self-node having reserved transmission with the upper node rewrites the data in the period of time 11:50-12:00 from "1" to "3" as illustrated in FIG. 8B. Further, the upper node having accepted the reservation for transmission made by the lower node similarly rewrites the data in the period of time 11:50-12:00 from "1" to "2".

FIGS. 9A and 9B illustrate diagrams for comparing exemplary periods of time data between the self-node and the management server 10. The periods of time from 11:00 to 12:40 are excerpted and illustrated in FIGS. 9A and 9B, as well. Communication-enabled periods of time of the self-node are 11:30-11:40, 11:50-12:00 and 12:00-12:10 as illustrated in FIG. 9A. Meanwhile, the management server 10 has reserved transmission or is in communication-disabled condition in those periods of time.

In this case, reserve transmission for the latest one of the communication-enabled periods of time of the self-node (12:00-12:10) in which the management server 10 has set itself communication-disabled, though.

If transmission is reserved with the management server 10, the self-node and the management server 10 each update the communication-enabled periods of time data. The self-node having reserved transmission with the management server 10 rewrites the data in the period of time 12:00-12:10 from "1" to "3" as illustrated in FIG. 9B. Further, the management server 10 having accepted the reservation for transmission made by the lower node similarly rewrites the data in the period of time 12:00-12:10 from "0" to "2".

Although it is supposed that one lower node makes a reservation per one period of time according to the embodiment, reservations may be accepted from a plurality of nodes per one period of time as described above. In this case, the nodes each may be configured to manage the number of reservations having been made and to choose a period of time of the smallest number of the reservations so as to reserve transmission.

Figure 10:
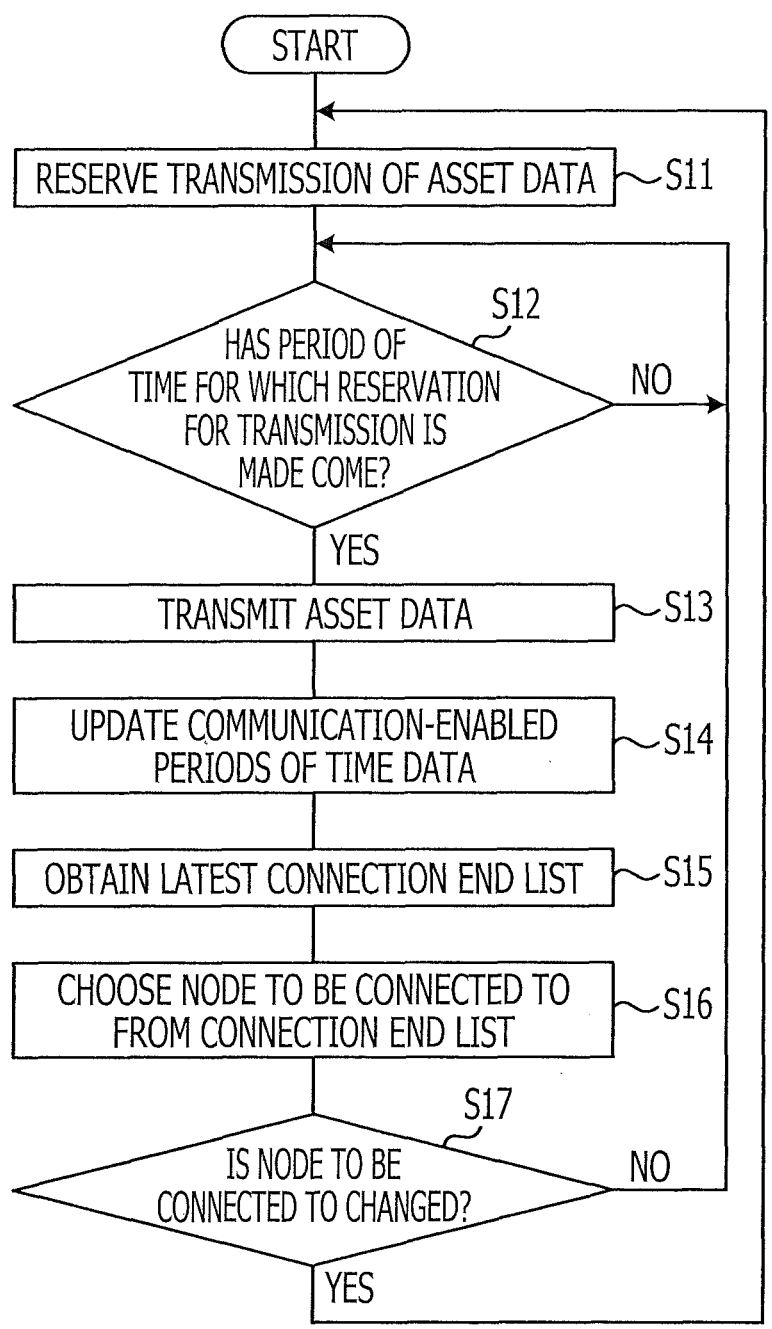
FIG. 10 illustrates an example of a procedure of processing for transmitting asset data.

FIG. 10 illustrates a procedure of processing for transmitting asset data. The transmission reserving unit 23 of the communication apparatus (e.g., communication apparatus 20c) reserves transmission of asset data with an upper node (S11). Then, the transmitter 25 decides whether a period of time for which the reservation for transmission is made has come (S12). If not (S12: NO), the transmitter 25 waits until the period of time for which the reservation for transmission is made comes.

Upon deciding that the period of time for which the reservation for transmission is made has come (S12: YES), the transmitter 25 reads the asset data from the asset data storing unit 27 and transmits the asset data to an upper node that the self-node is coupled to (S13). Then, the node data storing unit 21 updates the communication-enabled periods of time data included in the node data (S14).

Then, the connection end list managing unit 22 obtains a latest connection end list from the upper node that the self-node is coupled to (S15), and chooses to which node the self-node is coupled from the obtained latest connection end list (S16).

Then, the connection end list managing unit 22 decides whether the node that the self-node is coupled to is changed (S17). If changed (S17: YES), the flow returns to the S11. Unless changed (S17: NO), the flow returns to the S12.

Then, a procedure for reserving transmission with an upper node which may transmit asset data to the management server 10 before the transmission deadline comes will be explained. A procedure of processing explained below is run as required before a node that the self-node is coupled to is chosen, upon the self-node being notified that the reservation for transmission made with the upper node is turned down, or immediately after the asset data is transmitted.

Figure 11:
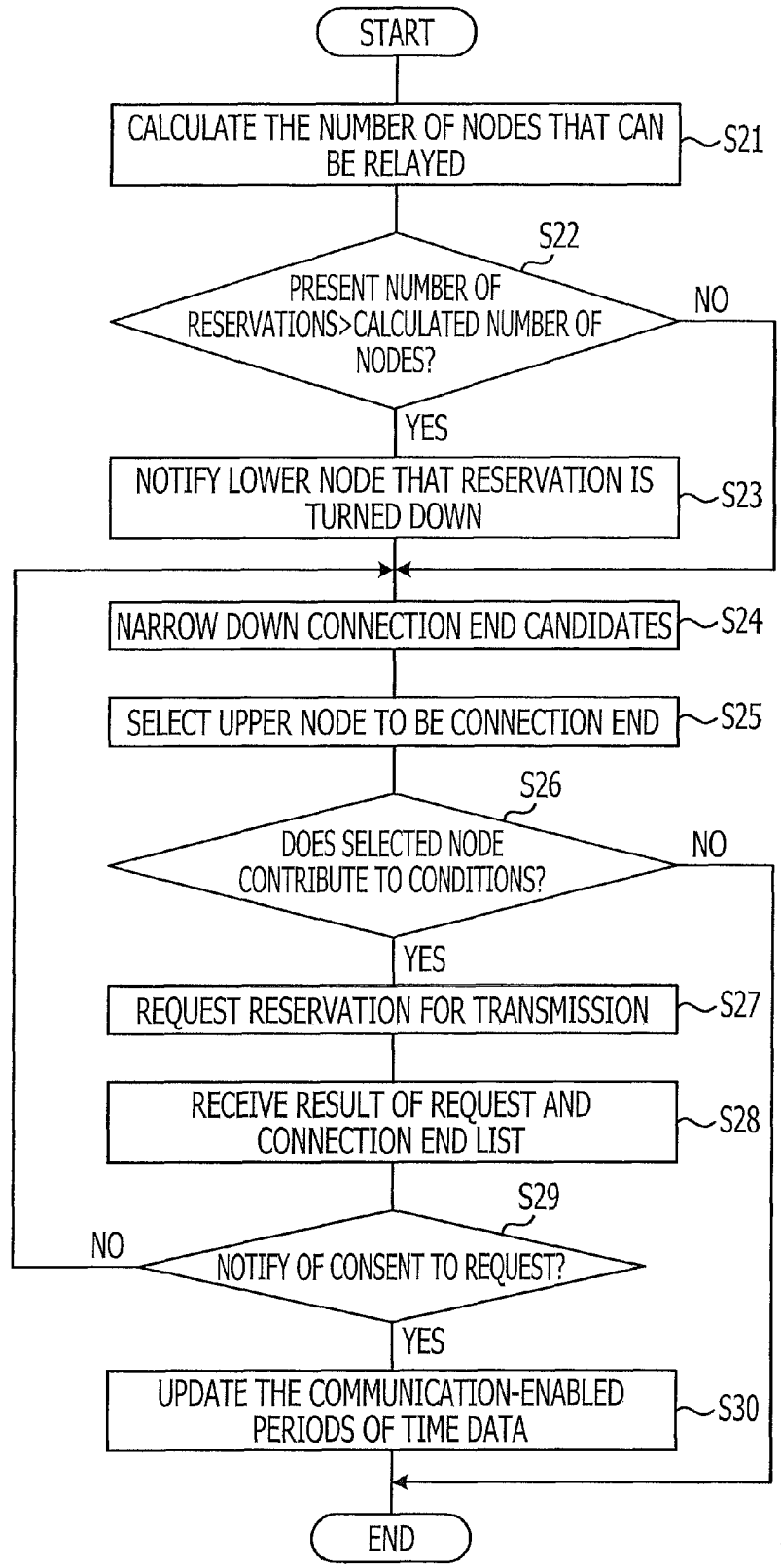
FIG. 11 illustrates an example of a procedure of processing for reserving transmission.

FIG. 11 illustrates an example of a procedure of processing for reserving transmission. Before the transmission reserving unit 23 requests a reservation for transmission, the request for reservation processing unit 24 adjusts the number of reservations that the self-node relays. The request for reservation processing unit 24 calculates the number of nodes that the self-node may relay (S21). The number of nodes that may be relayed may be calculated by division of a schedule unit of a period of time in which communication is enabled (a time length of a frame of a reservation: e.g., ten minutes) by a time length for transmission per one node (e.g., 5000 msec) as described above.

The request for reservation processing unit 24 decides whether the present number of reservations is above the number of nodes that may be relayed (S22). Upon deciding that the present number of reservations is above the number of nodes that may be relayed (S22: YES), the request for reservation processing unit 24 notifies the lower node that the reservation is turned down and cancelled (S23). At this time, the request for reservation processing unit 24 adjusts the number of the nodes so that the present number of reservations is not above the number of nodes that may be relayed. Incidentally, as the reservation for transmission of the self-node may be possibly updated in an earlier period of time, the request for reservation processing unit 24 notifies the lower nodes that the reservations are turned down in late order of periods of time for which the reservations are made. If the request for reservation processing unit 24 adjusts the number of the reservations, the node data storing unit 21 updates the communication-enabled periods of time data of the self-node included in the node data.

If the request for reservation processing unit 24 decides that the present number of reservations is not above the number of nodes that may be relayed (S22: NO) or notifies the lower nodes that the reservations are turned down at the S23, the transmission reserving unit 23 refers to the connection end list obtained from the upper node and the node data stored in the node data storing unit 21 so as to narrow down connection end candidates (S24). The transmission reserving unit 23 narrows down connection end candidates on the grounds, e.g., (a) that the asset data may be transmitted before the preset transmission deadline comes, (b) that a communication-enabled period of time exists on the connection end, (c) that the number of nodes that may be received is above the number of nodes that may be relayed on the connection end, (d) that the asset data reaches the management server 10 at an earlier date and time than a connection end having been determined, and (e) that the node has never been chosen since a process for choosing an upper node starts.

Then, the transmission reserving unit 23 selects the upper node to be the connection end from the narrowed-down result (S25). If the result of narrowing down the connection end candidates is zero and the connection end has already been selected, the transmission reserving unit 23 runs a process following a S26. If no connection end has been selected, the transmission reserving unit 23 checks the transmission deadline of the asset data. Before the transmission deadline comes, the transmission reserving unit 23 turns down one reservation requested by the lower node in late order of periods of time and returns to narrowing down the connection end candidates at the S24. If the transmission deadline has come, the transmission reserving unit 23 forcibly transmits the asset data to the management server 10 through the transmitter 25. If a reservation has been requested by the lower node at this time, the request for reservation processing unit 24 notifies the lower node that the reservation is turned down and cancels itself from being a relay node.

If the result of narrowing down the connection end candidates is one or more, the transmission reserving unit 23 chooses a node whose asset data reaches the management server 10 at the earliest date and time. If there is a plurality of nodes whose asset data reaches the management server 10 at the earliest date and time, a node of the minimum number of nodes that may be received or a node of the longest communication-enabled period of time may be chosen.

Then, the transmission reserving unit 23 decides whether the new selected connection end contributes to conditions (S26). If none of the conditions improves in a case where a connection with an upper node has already been reserved (S26: NO), end the process according to the flowchart as the present reservation is kept and used.

If the new selected connection end contributes to the conditions (S26: YES), e.g., transmission may be reserved for an earlier period of time, a node of the minimum number of nodes that may be received may be chosen and so forth, the transmission reserving unit 23 requests a reservation for transmission from the upper node selected at the S25 (S27).

Then, the receiver 26 receives a notification to accept or turn down the request for the reservation for transmission (result of request) and a new connection end list (S28). The node that the reservation has been requested from transmits the notification and the connection end list.

The transmission reserving unit 23 decides whether the notification received by the receiver 26 is to consent to the request or not (S29). If the notification is not to consent to the request (notification to turn down the request) (S29: NO), the process returns to the S24.

Upon receiving a notification to consent to the request for a reservation for transmission (S29: YES), the node data storing unit 21 updates the communication-enabled periods of time data included in the node data of the self-node (S30).

Figure 12:
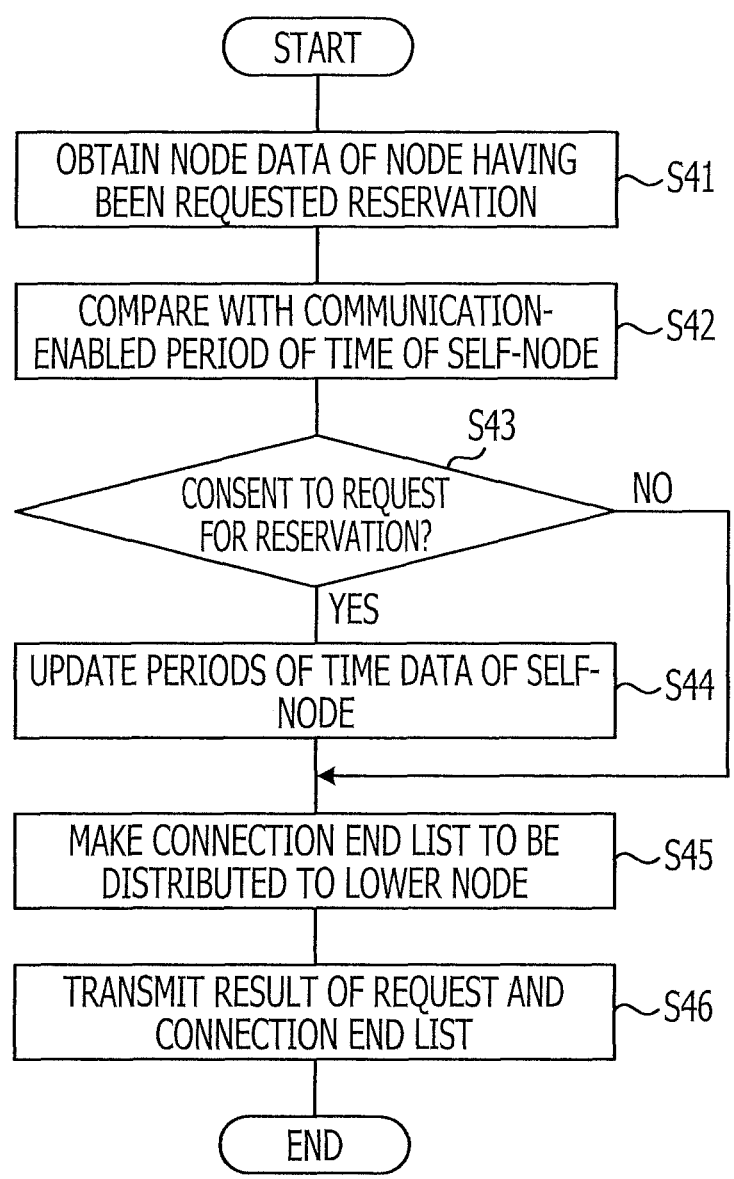
FIG. 12 illustrates an example of a procedure of processing in a case where a request for a reservation for transmission is received from a lower node.

FIG. 12 illustrates an example of a procedure of processing in a case where a request for a reservation for transmission is received from a lower node. If a request for a reservation for transmission is received from a lower node, the request for reservation processing unit 24 obtains node data of the node having been requested the reservation (S41). The request for reservation processing unit 24 compares communication-enabled periods of time data included in the obtained node data of the node having been requested the reservation with the communication-enabled periods of time data included in the node data of the self-node (S42), and decides whether the request for the reservation is consented to (S43).

If the request for the reservation is consented to (S43: YES), the node data storing unit 21 updates the communication-enabled periods of time data included in the node data of the self-node (S44). Further, the connection end list managing unit 22 makes a new connection end list to be distributed to the node having been requested the reservation (lower node) (S45). The connection end list managing unit 22 merges the node data included in the connection end list obtained from the upper node, the node data of the self-node and the node data of the lower node having reserved a connection with the self-node so as to make the connection end list (S45).

The connection end list managing unit 22 distributes a new connection end list to the node having requested the reservation if the request for the reservation is turned down (S43: NO), as well. Thus, the connection end list managing unit 22 makes a connection end list to be distributed similarly as in the case where the request for the reservation is consented to (S45).

Then, the request for reservation processing unit 24 notifies the lower node that the request is consented to or turned down (result of request), and transmits the new connection end list having been made (S46).

Then, a procedure for deciding whether there is a reservation slot being in time for the transmission deadline from node data of both ends of a connection so as to select a reservation slot for communication will be explained. The procedure for processing explained below will be run after a connection end candidate for next time is selected from the connection end list, or in order to decide whether a request having been made from a lower node for a reservation for transmission is consented to or not.

Figure 13:
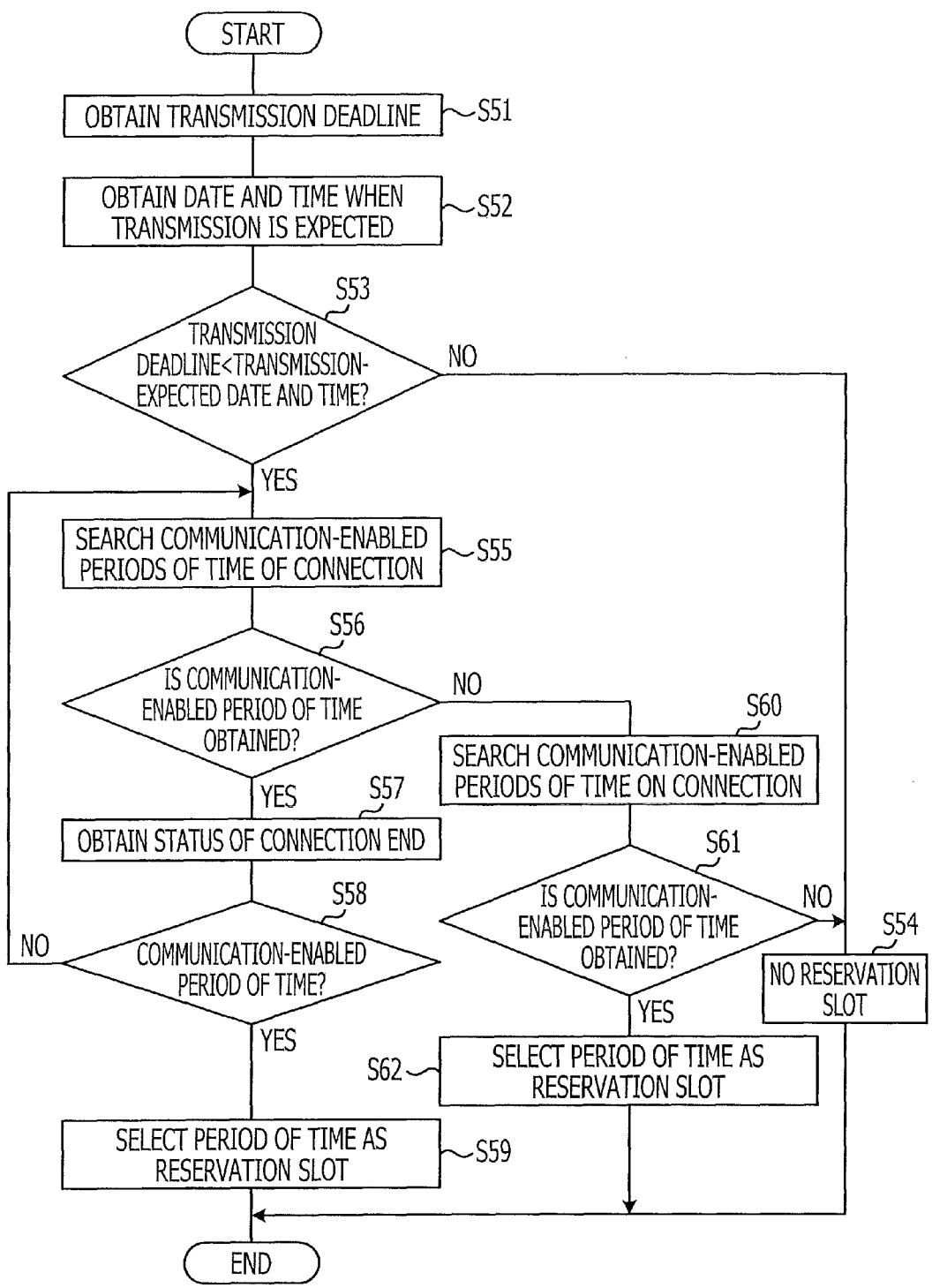
FIG. 13 illustrates an example of a procedure for selecting a reservation for connection.

FIG. 13 illustrates an example of a procedure for selecting a reservation for connection. The request for reservation processing unit 24 obtains a transmission deadline of asset data from node data of a connection root (S51), and obtains a date and time when transmission to an upper node is expected from node data of a connection end (S52).

Then, the request for reservation processing unit 24 decides whether the transmission deadline of the asset data is set earlier than the transmission-expected date and time of the connection end (S53). If the transmission deadline of the asset data is set later than the transmission-expected date and time of the connection end (S53: NO), the request for reservation processing unit 24 decides that there is no reservation slot as the asset data may possibly fail to reach the management server 10 before the deadline even if the connection end is used as a relay node (S54).

If the transmission deadline of the asset data is set earlier than the transmission-expected date and time of the connection end (S53: YES), the request for reservation processing unit 24 searches the periods of time being earlier than those for which the connection end has reserved connection and communication-enabled on the connection root from the final (latest) one in upstream order (S55). A period of time having been searched is excluded, though.

Then, the request for reservation processing unit 24 decides whether a communication-enabled period of time is obtained at the S55 (S56). If a communication-enabled period of time is obtained (S56: YES), the request for reservation processing unit 24 obtains a status of the connection end in the obtained period of time (S57).

The request for reservation processing unit 24 decides whether the obtained status represents being communication-enabled (S58). If the status represents being communication-enabled (S58: YES), the request for reservation processing unit 24 selects the period of time as a reservation slot (S59). Upon deciding that the obtained status does not represent being communication-enabled (S58: NO), the request for reservation processing unit 24 makes the process go back to the S55.

Further, upon deciding that no communication-enabled period of time is obtained (S56: NO), the request for reservation processing unit 24 searches communication-enabled periods of time on the connection end from the final (latest) one in upstream order (S60). Then, the request for reservation processing unit 24 decides whether a communication-enabled period of time is obtained (S61). If a communication-enabled period of time is obtained (S61: YES), the request for reservation processing unit 24 selects the period of time as a reservation slot (S62). Upon deciding that no communication-enabled period of time is obtained (S61: NO), the request for reservation processing unit 24 decides that there is no reservation slot (S54).

The respective communication apparatuses 20a, 20b and so forth each make a reservation for transmission with an upper node according to the processing procedure described above, so that a transmission path on which asset data may reach the management server 10 before the deadline may be built. FIG. 14 illustrates a transmission path from the self-node to the management server 10. Periods of time from 11:00 to 12:40 are excerpted and illustrated in FIG. 14. Let the deadline for the asset data reaching the management server 10 be 12:40 in FIG. 14.

An upper node on the third layer that the self-node is coupled to (upper 3) has reserved transmission with an upper node on the second layer (upper 2) for a period of time 11:30-11:40. The upper node on the second layer has reserved transmission with an upper node on the first layer (upper 1) for a period of time 12:20-12:30.

Thus, if the self-node reserves transmission with the upper node on the third layer for a period of time before 11:30, the asset data will reach the management server 10 before the deadline. See the periods of time data illustrated in FIG. 14 here. As the period of time 11:20-11:30 is communication-enabled for both the self-node and the upper node on the third layer, the self-node reserves transmission for this period of time.

The asset data that the self-node transmits in the period of time for which transmission is reserved reaches the management server 10 via the upper node on the third layer, the upper node on the second layer and the upper node on the first layer. As the number of reservations for each of the periods of time is limited according to the embodiment (e.g., limited to one node), connections to a certain node never concentrate on a particular period of time, and the load may be suitably distributed.

According to the embodiment described above, a path on which data is transmitted and a period of time in which data is transmitted may be set in accordance with load conditions of the management server 10 and the respective communication apparatuses 20a, 20b and so forth and the deadline for data to be transmitted (asset data) reaching a destination.

Further, even if one node cannot relay asset data because of a failure or a pause, another node may relay the asset data instead, so as to reduce risks of failing to collect the asset data because of a failure, etc.

Further, cases where the asset data of the respective devices does not reach the management server before the deadline may be made occur less frequently.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication apparatus comprising:
    a memory that stores data; and
    a processor to execute a process, the process including:
        obtaining time information which indicates a communication time period in which each of a first apparatus, a second apparatus and the communication apparatus is capable of communicating;
        deciding on the basis of the communication time period whether or not a first communication between the communication apparatus and the first apparatus is capable of being established in a first period of time, and whether or not a second period of time for a second communication between the first apparatus and the second apparatus is reserved, the second period of time being later than the first period of time, the first apparatus relaying the data stored in the memory from the communication apparatus to the second apparatus during the second period of time; and
        notifying the first apparatus of a reservation of the first period of time, in which the data stored in the memory is transmitted to the first apparatus from the communication apparatus, after it is decided that the second period of time is reserved.

2. A communication system comprising a first apparatus, a second apparatus and a third apparatus, the first apparatus including:
    a memory that stores data; and
    a processor that executes a process, the process comprising:
        obtaining time information which indicates a communication time period in which each of the first apparatus, the second apparatus and the third apparatus is capable of communicating;
        deciding on the basis of the communication time period whether or not a first communication between the first apparatus and the second apparatus is capable of being established in a first period of time, and whether or not a second period of time for a second communication between the second apparatus and the third apparatus is reserved, the second period of time being later than the first period of time, the second apparatus relaying the data stored in the memory from the first apparatus to the third apparatus during the second period of time; and notifying the second apparatus of a reservation of the first period of time of the second apparatus, in which the data stored in the memory is transmitted to the second apparatus from the first apparatus, after it is decided that the second period of time is reserved.

3. The communication system according to claim 2, wherein the second apparatus comprises:

a memory that stores another data being different from the data; and a processor that executes an another process, the another process including:

obtaining time information which indicates a communication time period in which each of the second apparatus and the third apparatus is capable of communicating;

deciding on the basis of the communication time period whether or not the second communication between the second apparatus and the third apparatus is capable of being established in the second period of time; and notifying the third apparatus of the second period of time, in which the data and the another data are transmitted to the third apparatus.

4. The communication system according to claim 3, wherein the process further includes:

transmitting the data to the second apparatus in the first period of time;

and the another process further includes:

transmitting the data and the another data to the third apparatus in the second period of time.

5. The communication system according to claim 3, wherein the another process further includes:

updating the communication time period indicating the first period of time to be disabled when the first apparatus is notified the first period of time.

6. A communication method comprising:

obtaining time information which indicates a communication time period in which each of a first apparatus, a second apparatus and a third apparatus is capable of communicating;

deciding on the basis of the communication time period whether or not a first communication between the first apparatus and the second apparatus is capable of being established in a first period of time, and whether or not a second period of time for a second communication between the second apparatus and the third apparatus is reserved, the second period of time being later than the first period of time, the second apparatus relaying data from the first apparatus to the third apparatus during the second period of time; and notifying the second apparatus of a reservation of the first period of time, in which the data is transmitted to the second apparatus from the first apparatus, after it is decided that the second period of time is reserved.

7. The communication method according to claim 6, further comprising:

obtaining time information which indicates a communication time period in which each of the second apparatus and the third apparatus, by the second apparatus is capable of communicating;

deciding on the basis of the communication time period whether or not the second communication between the second apparatus and the third apparatus is capable of being established in the second period of time; and notifying the third apparatus of the second period of time, in which an another data, stored in the second apparatus, and the data, transmitted by the first apparatus, are transmitted to the third apparatus by the second apparatus.

8. A non-transitory recording medium storing communication program that causes a computer configured to communicate with a first apparatus, which is configured to communicate with a second apparatus, to execute the procedure, the procedure comprising:

obtaining time information which indicates a communication time period in which each of the first apparatus, the second apparatus and the computer is capable of communicating;

deciding on the basis of the communication time period whether or not a first communication between the computer and the first apparatus is capable of being established in a first period of time, and whether or not a second period of time for a second communication between the first apparatus and the second apparatus is reserved, the second period of time being later than the first period of time, the first apparatus relaying data stored in the computer from the computer to the second apparatus during the second period of time; and notifying the first apparatus of a reservation of the first period of time, in which the data stored in the computer is transmitted to the first apparatus from the computer, after it is decided that the second period of time is reserved.

9. A communication apparatus comprising:

storing means for storing data;

obtaining means for obtaining time information which indicates a communication time period in which each of the communication apparatus, a first apparatus and a second apparatus is capable of communicating;

deciding means for deciding on the basis of the communication time period whether or not a first communication between the communication apparatus and the first apparatus is capable of being established in a first period of time, and whether or not a second period of time for a second communication between the first apparatus and the second apparatus is reserved, the second period of time being later than the first period of time, the first apparatus relaying the data stored in the storing means from the communication apparatus to the second apparatus during the second period of time; and notifying means for notifying the first apparatus of a reservation of the first period of time, in which the data stored in the storing means is transmitted to the first apparatus from the communication apparatus, after it is decided that the second period of time is reserved.

10. A communication system comprising:

a first apparatus;

a second apparatus; and a third apparatus, wherein the first apparatus includes:

storing means for storing data;

obtaining means for obtaining time information which indicates a communication time period in which each of the first apparatus, the second apparatus and the third apparatus is capable of communicating;

deciding means for deciding on the basis of the communication time period whether or not a first communication between the first apparatus and the second apparatus is capable of being established in a first period of time, and whether or not a second period of time for a second communication between the second apparatus and the third apparatus is reserved, the second period of time being later than the first period of time, the second apparatus relaying the data stored in the memory from the first apparatus to the third apparatus during the second period of time; and notifying means for notifying the second apparatus of a reservation of the first period of time of the second apparatus, in which the data stored in the storing means is transmitted to the second apparatus from the first apparatus, after it is decided that the second period of time is reserved.

\* \* \* \* \*